United States Patent
Chiang

(10) Patent No.: US 7,562,932 B2
(45) Date of Patent: Jul. 21, 2009

(54) SEAT SUPPORT STRUCTURE OF A BICYCLE

(75) Inventor: Douglas Chiang, Taichung (TW)

(73) Assignee: Tien Hsin Indistries Co., Ltd., Taichung County (TW)

( * ) Notice: Subject to any disclaimer, the term of this patent is extended or adjusted under 35 U.S.C. 154(b) by 44 days.

(21) Appl. No.: 11/938,760

(22) Filed: Nov. 12, 2007

(65) Prior Publication Data
US 2009/0121451 A1    May 14, 2009

(51) Int. Cl.
*B62K 19/36* (2006.01)
*B62J 1/02* (2006.01)

(52) U.S. Cl. ............... 297/195.1; 280/274; 297/215.14; 248/407

(58) Field of Classification Search ............... 280/279, 280/280, 287, 288.4, 274; 74/551.3; 297/195.1, 297/195.13, 215.14; 403/109.3; 248/408, 248/407
See application file for complete search history.

(56) References Cited

U.S. PATENT DOCUMENTS

| | | | | |
|---|---|---|---|---|
| 4,274,301 A | * | 6/1981 | Katayama | 74/551.1 |
| 5,213,006 A | * | 5/1993 | Liao | 74/551.1 |
| 5,330,302 A | * | 7/1994 | Chen | 411/79 |
| 5,618,052 A | * | 4/1997 | Rendall | 280/288.4 |
| 6,354,557 B1 | * | 3/2002 | Walsh | 248/600 |
| 6,499,800 B2 | * | 12/2002 | Morgan, Jr. | 297/195.1 |
| 6,585,215 B2 | * | 7/2003 | Duncan | 248/407 |
| 6,957,856 B2 | * | 10/2005 | Chiang et al. | 297/195.1 |
| 7,025,522 B2 | * | 4/2006 | Sicz et al. | 403/109.2 |
| 7,044,542 B2 | * | 5/2006 | Muscat | 297/215.15 |
| 2007/0132203 A1 | * | 6/2007 | Yamakoshi | 280/288.4 |
| 2008/0258517 A1 | * | 10/2008 | Julliard et al. | 297/215.13 |

* cited by examiner

*Primary Examiner*—Tony H. Winner

(57) ABSTRACT

A seat support structure of a bicycle comprises a seat supporting tube; a seat supporting rod received in the seat supporting tube; a lower lateral side of the seat supporting rod having a first inclined surface; the seat supporting rod being formed with an upper hole and a lower tapered hole; a tightening assembly received in the seat supporting tube; the tightening assembly having a tightening unit, an embedding unit; and a stud; in assembly, a screw post of a stud passes through the upper hole, the lower tapered hole, the stud hole of the tightening assembly and the embedding hole of an embedding hole so as to combine the tightening assembly to the seat supporting rod; then the seat supporting rod and the tightening assembly are placed within the seat supporting tube.

11 Claims, 5 Drawing Sheets

US 7,562,932 B2

SEAT SUPPORT STRUCTURE OF A BICYCLE

FIELD OF THE INVENTION

The present invention relates to bicycle parts, and particularly to a seat support structure of a bicycle, wherein a tightening assembly is used to assembly the parts of the seat support structure with less elements and cheap cost. The elevation of the seat support structure can be adjusted easily and conveniently.

BACKGROUND OF THE INVENTION

In the prior art seat support structure of a bicycle, U.S. Pat. No. 7,025,367 discloses an adjustable air cushion bicycle seat hydraulic ram system mounted within the seat post of a bicycle frame, having: a. a hollow ram with one end attached to the bicycle seat and an open end, b. an internal bicycle frame reservoir with an open end secured to the seat post sized to accommodate the open end of the ram slideably sealed in the internal bicycle frame reservoir open end to create an enclosed pressurized liquid/air column within the internal bicycle frame reservoir, c. a valve with walls defining channels in communication and located between the internal bicycle frame reservoir wherein the thickness of the valve walls and size of the wall channels and the liquid are selected to provide hydraulic flow resistance to delay the response of the ram to rapid changes in the internal bicycle frame reservoir pressure to prevent abrupt extension or contraction of the ram mounted seat to shock to the rider, and d. an adjustable pressurized air/liquid reservoir having filling means to selectively fill the air/liquid reservoir such that the valve adjusts the height, volume, and pressure of the air and liquid columns within the internal bicycle frame reservoir to form a desired air cushion within the ram to provide the desired ride cushion.

The prior art seat support structure of a bicycle has complicated structures and contains a large amount of parts so that the cost is high and it is difficult to assembly and also difficult to adjust the elevation of the seat support structure. Thereby the tightness of the whole structure is not preferred.

SUMMARY OF THE INVENTION

Accordingly, the primary object of the present invention is to provide a seat support structure of a bicycle, wherein a tightening assembly is used to assembly the parts of the seat support structure with less elements and cheap cost. The elevation of the seat support structure can be adjusted easily and conveniently.

To achieve above objects, the present invention provides a seat support structure of a bicycle, comprising: a seat supporting tube; a seat supporting rod received in the seat supporting tube; a lower lateral side of the seat supporting rod having a first inclined surface so that the lower end of the seat supporting rod has a smaller cross area; the seat supporting rod being formed with an upper hole and a lower tapered hole; a smaller end of the lower tapered hole being communicated to the upper hole; the upper hole and lower tapered hole penetrating through the seat supporting rod; the lower tapered hole being communicated to the first inclined surface; a tightening assembly received in the seat supporting tube; the tightening assembly having a tightening unit, an embedding unit; and a stud; the tightening unit having a second inclined surface which is corresponding to the first inclined surface; in assembly, the second inclined surface being installed to be adhered to the first inclined surface; the tightening unit having a stud hole corresponding to the lower tapered hole; the stud hole being a tapered hole; a small end of the stud hole being opened at the second inclined surface; the tightening unit further having an embedding hole which is approximately vertical to the stud hole; a shape of the outer surface of the tightening unit being matched to an inner surface of the seat supporting tube; and the embedding unit being received into the embedding hole; the embedding unit having a screw hole; and wherein in assembly, the embedding unit is received into the embedding hole so that the embedding hole of the embedding unit is aligned to the stud hole of the tightening unit; and then the screw post of the stud passes through the upper hole, the lower tapered hole, the stud hole and the embedding hole so as to combine the tightening assembly to the seat supporting rod; then the seat supporting rod and the tightening assembly are placed within the seat supporting tube.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
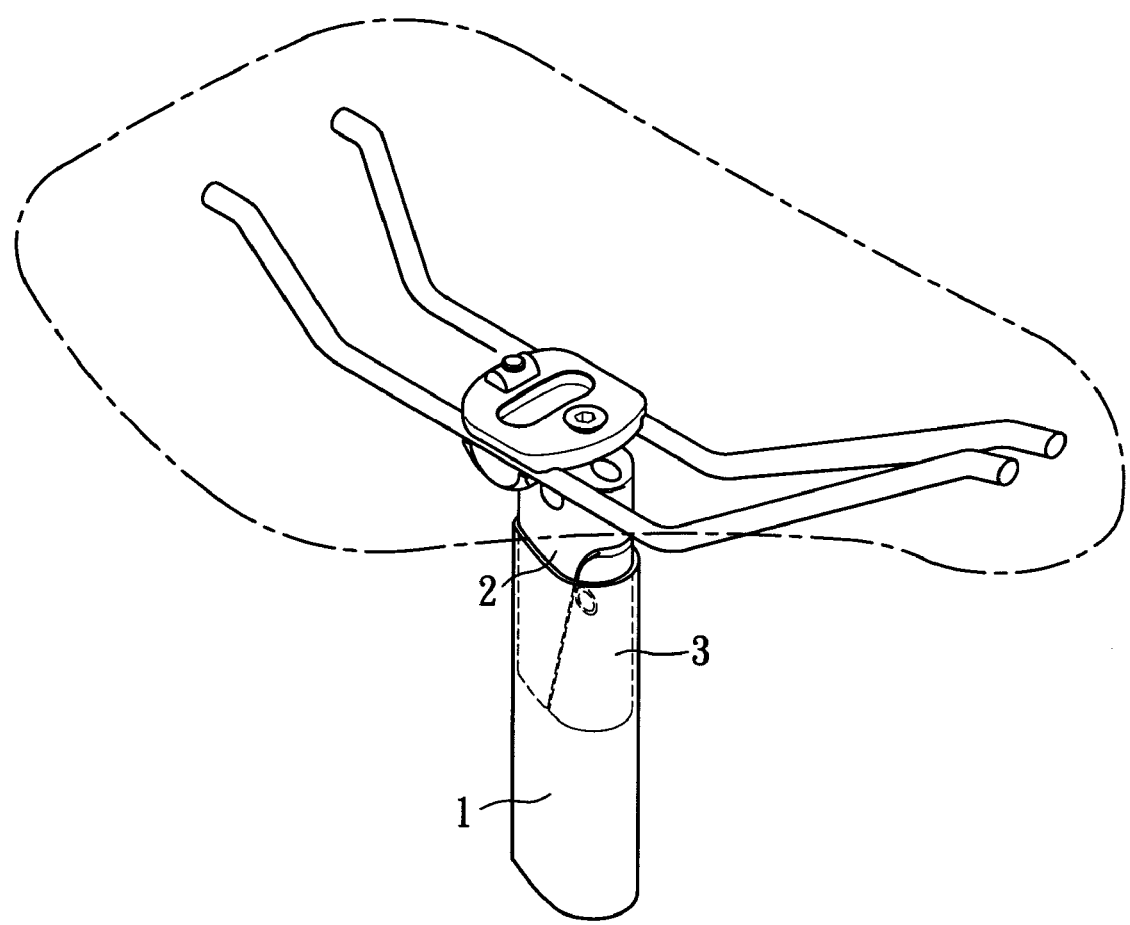
FIG. 1 is a schematic perspective view of the seat support structure of a bicycle of the present invention.
Figure 2:
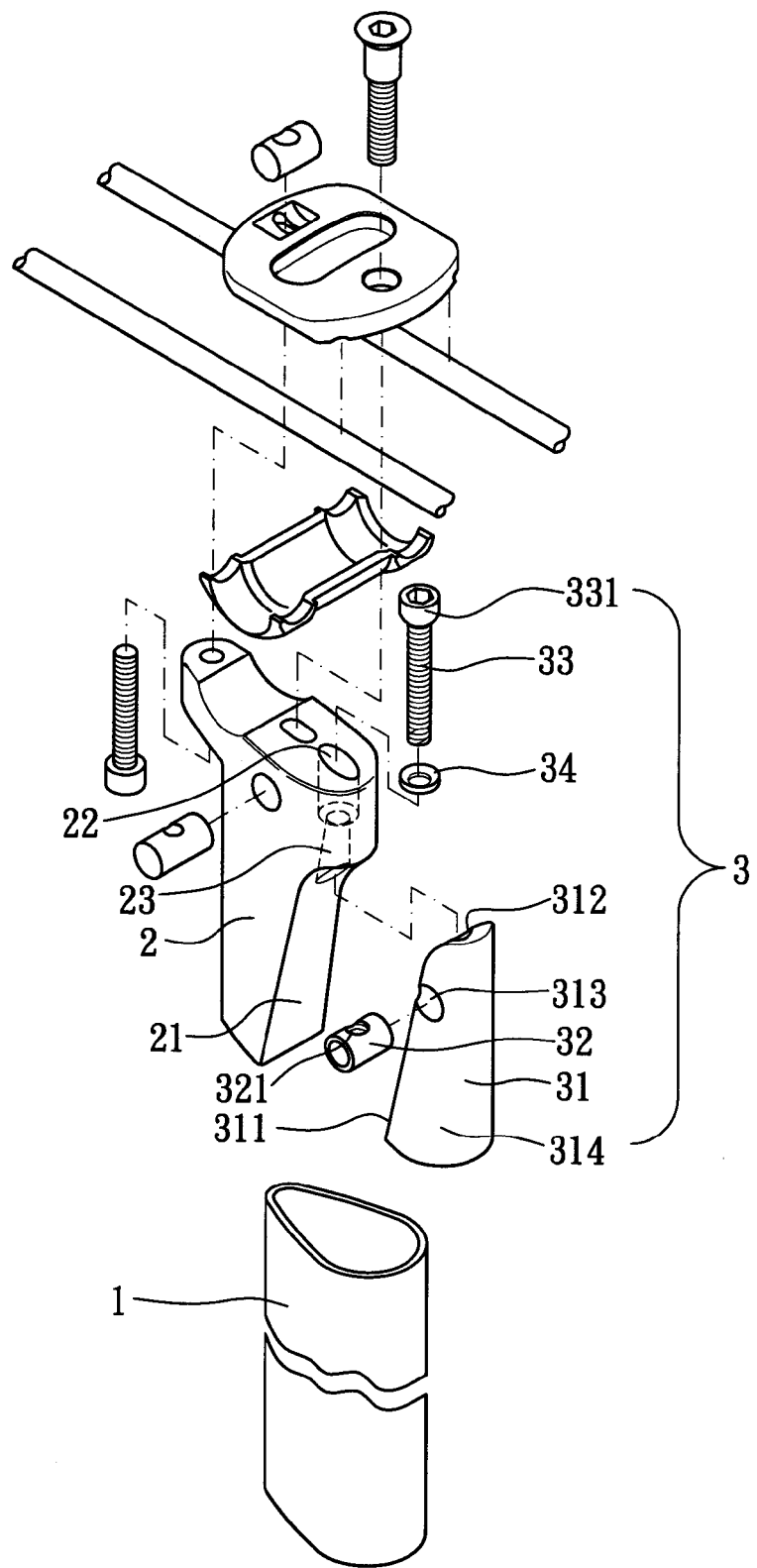
FIG. 2 is an exploded perspective view of the seat support structure of a bicycle of the present invention.

Referring to FIGS. 1 and 2, the seat support structure of a bicycle according to the present invention is illustrated. The present invention has the following elements.

A seat supporting tube 1 is included. In the drawing, the cross section of the seat supporting tube 1 has a shape like a water drop, but it is not used to confine the scope of the present invention, other shapes are permissible.

A seat supporting rod 2 is received in the seat supporting tube 1. A lower lateral side of the seat supporting rod 2 has a first inclined surface 21 so that the lower end of the seat supporting rod 2 has a smaller cross area. The seat supporting rod 2 is formed with an upper hole 22 and a lower tapered hole 23. A smaller end of the lower tapered hole 23 is communicated to the upper hole 22. The upper hole 22 and lower tapered hole 23 penetrate through the seat supporting rod 2. The upper hole 22 has a round shape and the area of the cross section of the upper hole 22 is greater than that of the lower tapered hole 23. The lower tapered hole 23 has elliptical cross sections. A larger end of the lower tapered hole 23 is communicated to the first inclined surface 21.

A tightening assembly 3 is received in the seat supporting tube 1. The tightening assembly 3 has a tightening unit 31, a stud 33 and a washer 34.

The tightening unit 31 has a second inclined surface 311 which is corresponding to the first inclined surface 21. In assembly, the second inclined surface 311 is installed to be adhered to the first inclined surface 21. The tightening unit 31 has a stud hole 312 corresponding to the lower tapered hole 23. The stud hole 312 has an elliptical cross section and is a tapered hole. A small end of the stud hole 321 is opened at the second inclined surface 311. The tightening unit 31 further has an embedding hole 313 which is approximately vertical to the stud hole 312. An outer surface of the tightening unit 31 has a coarse surface which is formed by sanding or texturing. The shape of the outer surface of the tightening unit 31 is matched to an inner surface of the seat supporting tube 1.

The embedding unit 32 is received into the embedding hole 313. The embedding unit 32 has a screw hole 321.

The stud 33 has a head 331. A bottom of the head 331 is formed as a protruded cambered shape.

The washer 34 is a ring and has a recessed upper side so as to match the bottom of the head 331.

In assembly, the embedding unit 32 is received into the embedding hole 313 so that the embedding hole 313 of the embedding unit 32 is aligned to the stud hole 312 of the tightening unit 31. Then, the washer 34 is sleeved to the stud 33 and then the screw post of the stud 33 passes through the upper hole 22, the lower tapered hole 23, the stud hole 312 and the screw hole 321 so as to combine the tightening assembly 3 to the seat supporting rod 2. Then the seat supporting rod 2 and the tightening assembly 3 are placed within the seat supporting tube 1.

Figure 3:
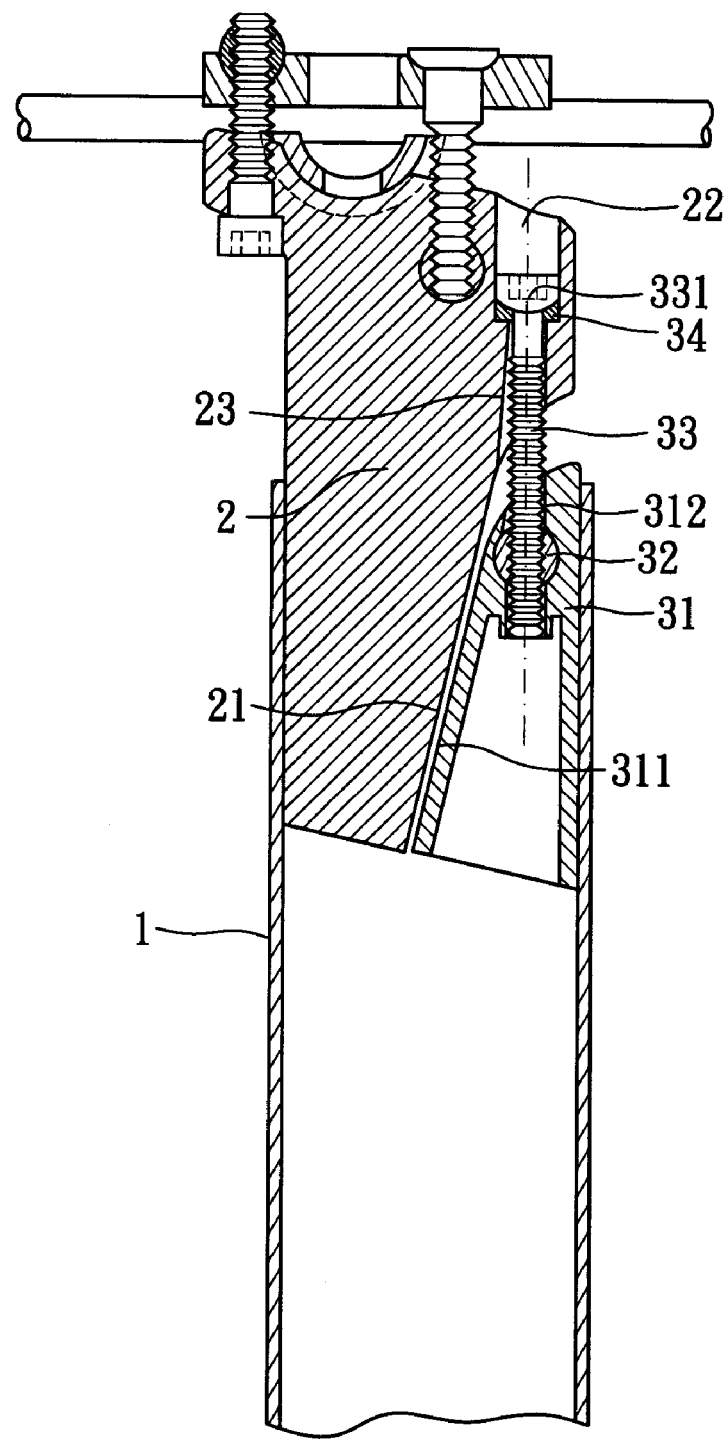
FIG. 3 is a schematic cross sectional view about the seat support structure of a bicycle of the present invention.
Figure 4:
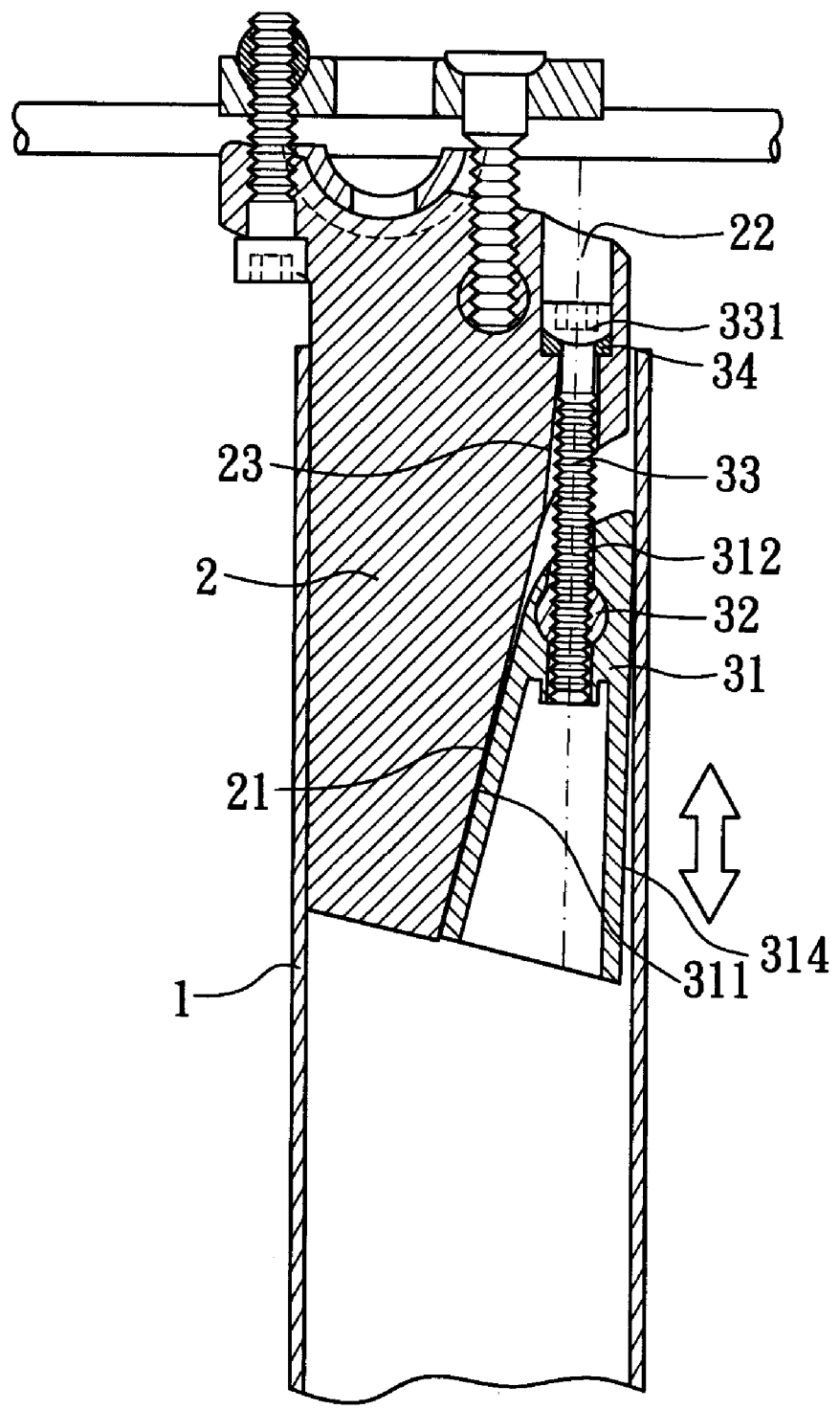
FIG. 4 is a schematic cross sectional view about the operation of the seat support structure of a bicycle of the present invention.
Figure 5:
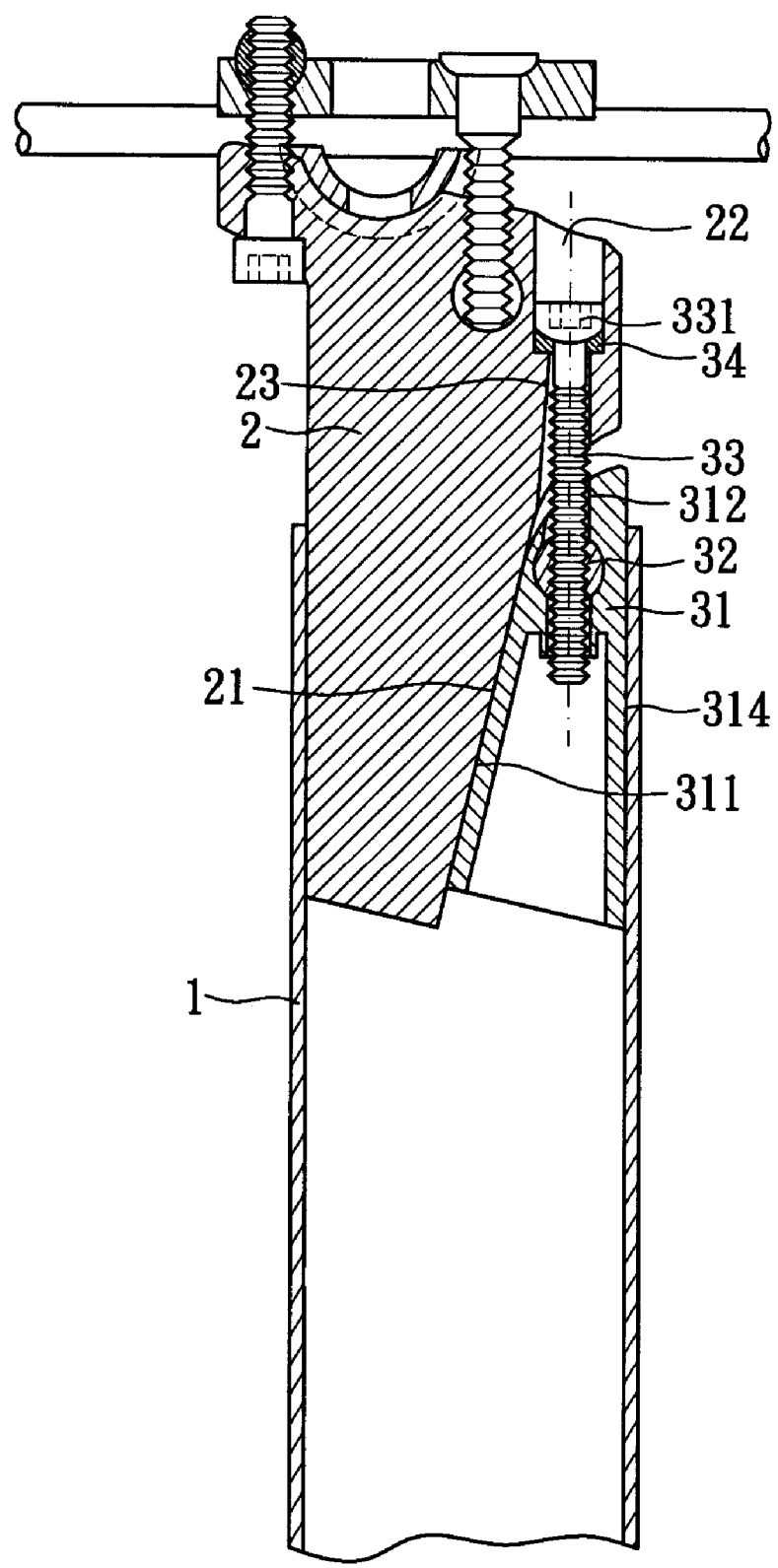
FIG. 5 is a schematic cross sectional view about the seat support structure of a bicycle of the present invention.

In operation, referring to FIGS. 3 to 5, in FIG. 3, since the lower tapered hole 23 and the stud hole 312 have elliptical shapes, in manufacturing, the size of the lower tapered hole 23 and the stud hole 312 have a great flexibility. Thus the cost is lowered and the assembly can be positioned easily and conveniently.

The operation of the present invention is illustrated in FIG. 4. By screwing the stud 33, the tightening unit 31 can move along the first inclined surface 21. In releasing, the tightening unit 31 is moved downwards along the first inclined surface 21. In locking, the tightening unit 31 moves upwards along the first inclined surface 21. The outer periphery 314 of the tightening unit 31 is in contact with the inner surface of the seat supporting tube 1. Furthermore, the washer 34 and the bottom of the head 331 have cambered shapes. In locking, they push outwards so that the outer periphery 314 full contacts the inner surface of the seat supporting tube 1 so as to have a preferred tightening effect.

The locking state of the present invention is illustrated in FIG. 5, the outer periphery is adhered to the inner surface of the seat supporting tube 1. Furthermore, the second inclined surface 311 is adhered to the first inclined surface 21 so as to have the effect of locking.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A seat support structure of a bicycle, comprising:
    a seat supporting tube;
    a seat supporting rod received in the seat supporting tube; a lower lateral side of the seat supporting rod having a first inclined surface so that a lower end of the seat supporting rod has a smaller cross area; the seat supporting rod being formed with an upper hole and a lower tapered hole; a smaller end of the lower tapered hole being communicated to the upper hole; the upper hole and lower tapered hole penetrating through the seat supporting rod; the lower tapered hole being communicated to the first inclined surface;
    a tightening assembly received in the seat supporting tube; the tightening assembly having a tightening unit, and a stud;
    the tightening unit having a second inclined surface which is corresponding to the first inclined surface; in assembly, the second inclined surface being installed to be adhered to the first inclined surface; the tightening unit having a stud hole corresponding to the lower tapered hole; the stud hole being a tapered hole; a small end of the stud hole being opened at the second inclined surface; a shape of the outer surface of the tightening unit being matched to an inner surface of the seat supporting tube; and
    wherein in assembly, a screw post of the stud passes through the upper hole, the lower tapered hole, and the stud hole so as to combine the tightening assembly to the seat supporting rod; and the seat supporting rod and the tightening assembly are placed within the seat supporting tube.

2. The seat support structure of a bicycle as claimed in claim 1, wherein the stud has a head; and a bottom of the head is formed as a protruded cambered shape.

3. The seat support structure of a bicycle as claimed in claim 2, wherein the tightening assembly further comprises a washer which is a ring and has a recessed upper side so as to match the bottom of the head; and the washer is sleeved to the stud.

4. The seat support structure of a bicycle as claimed in claim 1, wherein the lower tapered hole has an elliptical cross section.

5. The seat support structure of a bicycle as claimed in claim 1, wherein an outer surface of the tightening unit has a coarse surface by sanding or texturing.

6. A seat support structure of a bicycle, comprising:
    a seat supporting tube;
    a seat supporting rod received in the seat supporting tube; a lower lateral side of the seat supporting rod having a first inclined surface so that a lower end of the seat supporting rod has a smaller cross area; the seat supporting rod being formed with an upper hole and a lower tapered hole; a smaller end of the lower tapered hole being communicated to the upper hole; the upper hole and lower tapered hole penetrating through the seat supporting rod; the lower tapered hole being communicated to the first inclined surface;
    a tightening assembly received in the seat supporting tube; the tightening assembly having a tightening unit, an embedding unit; and a stud;
    the tightening unit having a second inclined surface which is corresponding to the first inclined surface; in assembly, the second inclined surface being installed to be adhered to the first inclined surface; the tightening unit having a stud hole corresponding to the lower tapered hole; the stud hole being a tapered hole; a small end of the stud hole being opened at the second inclined surface; the tightening unit further having an embedding hole which is disposed approximately vertical to the stud hole; a shape of the outer surface of the tightening unit being matched to an inner surface of the seat supporting tube; and
    the embedding unit being received into the embedding hole; the embedding unit having a screw hole; and wherein in assembly, the embedding unit is received into the embedding hole so that the embedding hole of the embedding unit is aligned to the stud hole of the tightening unit; a screw post of the stud passes through the upper hole, the lower tapered hole, the stud hole and the embedding hole so as to combine the tightening assembly to the seat supporting rod; the seat supporting rod and the tightening assembly are placed within the seat supporting tube.

7. The seat support structure of a bicycle as claimed in claim 6, wherein the stud has a head; and a bottom of the head is formed as a protruded cambered shape.

8. The seat support structure of a bicycle as claimed in claim 7, where the tightening assembly further comprises a washer which is a ring and has a recessed upper side so as to match the bottom of the head; and the washer is sleeved to the stud.

9. The seat support structure of a bicycle as claimed in claim 6, wherein the lower tapered hole has an elliptical cross section.

10. The seat support structure of a bicycle as claimed in claim 6, wherein the tightening unit has a stud hole corresponding to the lower tapered hole; the stud hole has an elliptical cross section and is a tapered hole; and a small end of the stud hole is opened at the second inclined surface.

11. The seat support structure of a bicycle as claimed in claim 6, wherein an outer surface of the tightening unit has a coarse surface by sanding or texturing.

* * * * *